Sept. 26, 1933.     H. F. VICKERS     1,928,144
FLUID PRESSURE ACTUATING DEVICE
Filed Nov. 8, 1929     2 Sheets-Sheet 1
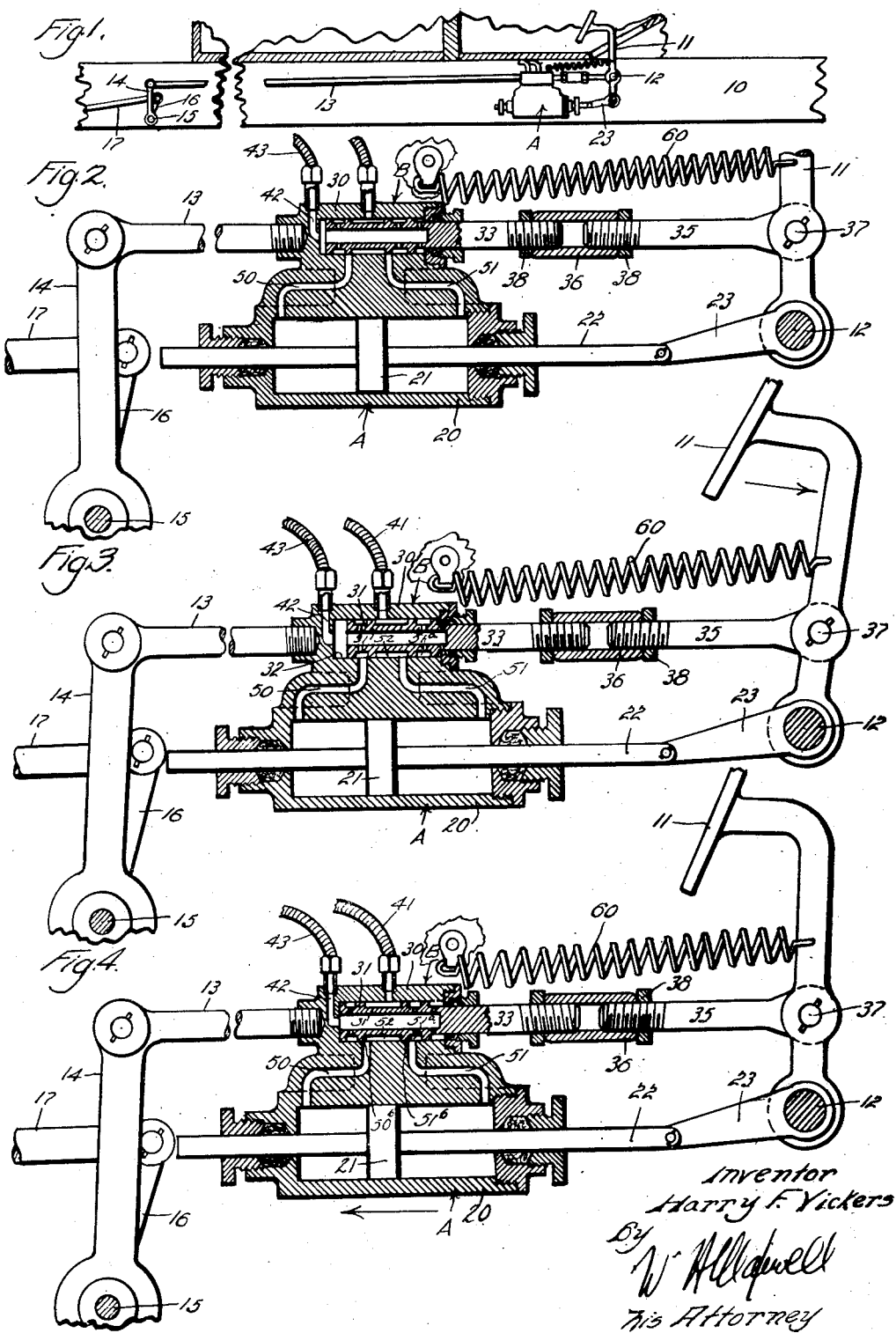
Inventor
Harry F. Vickers
By
His Attorney Sept. 26, 1933.    H. F. VICKERS    1,928,144
FLUID PRESSURE ACTUATING DEVICE
Filed Nov. 8, 1929    2 Sheets-Sheet 2
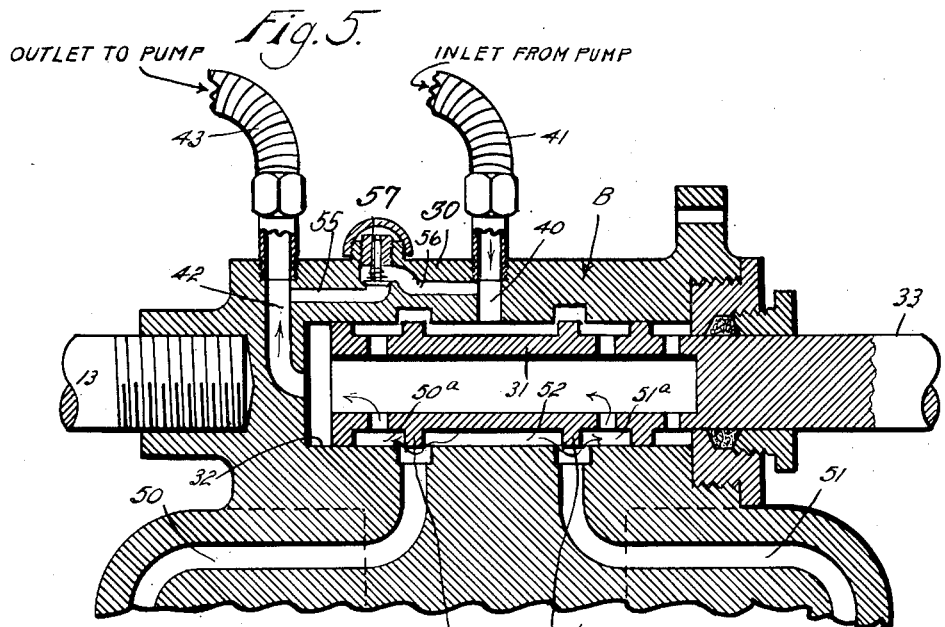
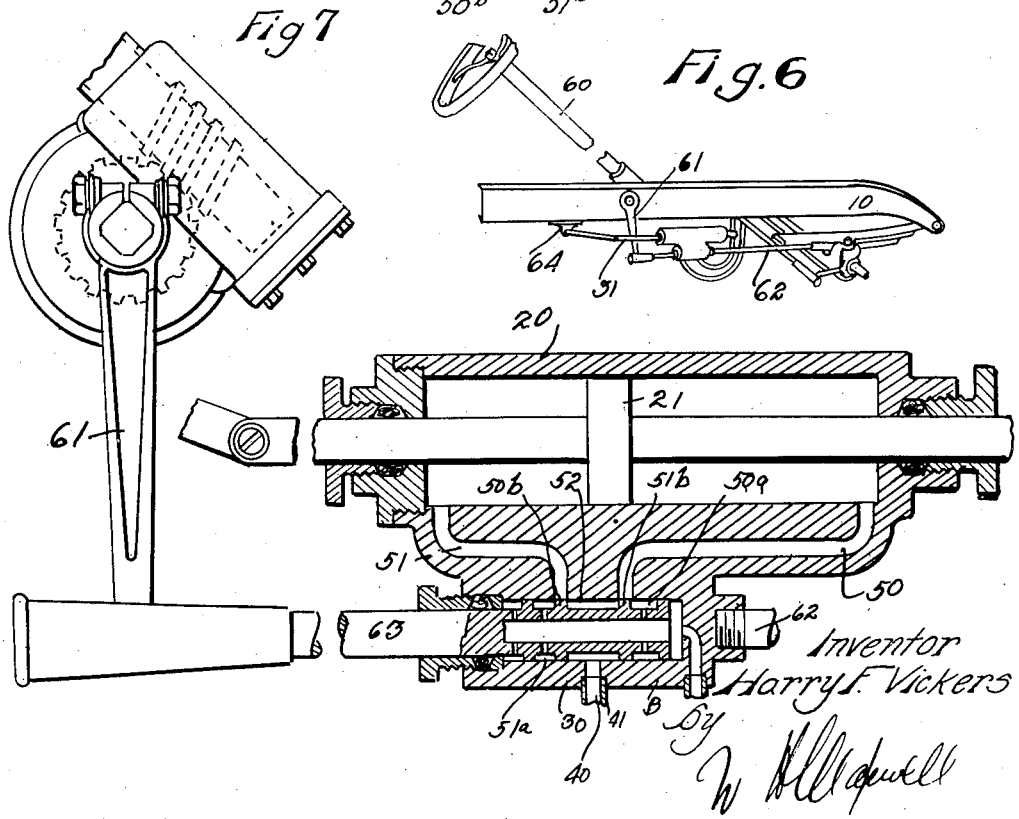
Inventor
Harry F. Vickers
by
his Attorney Patented Sept. 26, 1933

1,928,144

UNITED STATES PATENT OFFICE 1,928,144

FLUID PRESSURE ACTUATING DEVICE

Harry F. Vickers, Los Angeles, Calif.

Application November 8, 1929. Serial No. 405,817

11 Claims. (Cl. 121—41)

This invention has to do with a fluid pressure actuating device applicable to a movable element and a control or operating member therefor, it being an object of the invention to provide an improved mechanism for operating a movable element by fluid pressure under control of an operating member.

The present invention is suited to numerous uses and applications, being useful in practically any situation in which there is an element subject to actuation by fluid pressure, and a control or operating member for such element.

In this disclosure a detailed description will be given one simple form and application of the invention, such description being of a practical application of the invention and being given with a view of facilitating an understanding of the principles of the invention. It is to be understood, however, that the detailed application hereinafter set forth is not to be construed as limiting or restricting the scope or range of application of the invention, but, on the other hand, is to be considered in a general way and in light of the fact that it is primarily for the purpose of facilitating an understanding of the broad phases of the invention.

It is an object of the present invention to provide a fluid pressure actuated device operable to actuate a movable element by fluid pressure under accurate control of a control member.

A further object of the invention is to provide a fluid pressure actuated device operable to move an element under pressure responsive to movement of a control member and to hold the element stationary corresponding to the position of the control member.

Another object of the present invention is to provide a device of the character mentioned employing a cylinder and piston and a control valve, the valve being movable bodily with the actuated element.

It is a more specific object of the present invention to provide a device of the general character mentioned operable to cause fluid pressure actuation of a brake mechanism, or the like, under control of a manually movable member, say, for instance, a foot pedal, or the like.

It is a further object of the invention to provide a mechanism of the character mentioned above applicable to a brake operating mechanism, or the like, to cause fluid pressure actuation of the mechanism and such that the mechanism is at all times in condition for manual operation in case of failure of the fluid pressure means.

It is a further object of the present invention to provide a device of the character referred to which is in the nature of a unit that can be easily, conveniently and effectively inserted in a brake actuating mechanism, or the like, particularly mechanisms of the character such as are employed in motor vehicles, and the like.

The various objects and features of my invention will be best and more fully understood from the following detailed description of a typical form and application of the invention, throughout which description reference is had to the accompanying drawings, in which:

Fig. 1 is a sectional view of a portion of a conventional type of motor vehicle showing a part of the frame of the vehicle and certain of the parts of the brake actuating mechanism, the device of the present invention being shown applied to the brake actuating mechanism so that the pull rod of the mechanism is actuated by fluid pressure under control of the foot pedal which is normally used to actuate the pull rod.

Fig. 2 is an enlarged detailed sectional view of the device provided by this invention showing its application to the brake mechanism and showing the parts in the neutral position.

Fig. 3 is a view similar to Fig. 2 showing the position of the parts when the pedal of the mechanism is being moved forward and the device of the present invention is operating to move the pull rod by fluid pressure.

Fig. 4 is a view similar to Figs. 2 and 3 showing the positioning of the parts when the pedal is moved back or being returned and the pull rod is being returned by fluid pressure.

Fig. 5 is an enlarged detailed sectional view of the working parts of the device.

Fig. 6 is a perspective view illustrating more or less diagrammatically a typical form and application of the invention applied to the standard form of steering gear employed on motor vehicles.

Fig. 7 is a view showing the mechanism provided by this invention in connection with other parts of the steering gear, the mechanism being shown in section, the parts being illustrated in the unactuated position.

As pointed out above, the present invention is subject to a wide range of application and may be used in numerous situations and in connection with various devices or mechanisms. The preferred application of the invention set forth in this disclosure is shown as being embodied in the fluid pressure operation of a brake actuating mechanism under control of a movable part such as a manually operable member or pedal.

In Fig. 1 of the drawings I have disclosed enough of the parts of a typical motor vehicle to facilitate an understanding of a simple application of the present invention to the brake actuating mechanism thereof. In the drawings I have shown a vehicle frame 10 and a brake actuating mechanism carried in the frame and including a foot pedal 11 pivotally mounted on a fixed shaft 12, a pull rod 13 corresponding to the pull rod of the ordinary brake actuating mechanism which extends rearwardly of the vehicle from the pedal 11, a lever arm 14 to which the rear end of the pull rod is connected, a rock shaft 15 carrying the arm 14, a second arm 16 on the rod shaft, and a rod or link 17 connected to the arm 16 and extending therefrom to the movable element of the brake mechanism proper. The general form and arrangement of brake actuating mechanism just referred to is more or less typical of that found in motor vehicles, and the like. The various forms or modifications of mechanisms of this character are familiar to those skilled in the art, and therefore need no detailed mention in this disclosure.

The device, which is the subject of this invention, considered generally, is adapted for use in connection with a movable element and a control member so that the movable element is actuated under the influence of fluid pressure, such actuation being under full control of the control member. In the application of the invention herein set forth the pull rod 13 of the brake actuating mechanism may be considered the movable element to be operated under the action of fluid pressure, and the foot pedal 11 may be considered the control member. In such application the movable element is merely a link or intermediate part of a mechanism whereas in certain applications of the invention the element actuated by the device of the invention may be a finally or ultimately actuated member or element. Further, in the specific application herein set forth the control member or pedal 11 is a manually operable element, whereas, in the broad applications of the invention, this member may be of various forms and may be operated in any manner, for instance, it may be power operated, automatically operated, etc.

The device of the present invention includes generally a fluid pressure actuated mechanism A and valve means B. In its preferred form the mechanism A embodies two parts, a cylinder 20 and a piston 21 operable in the cylinder, and has one part connected to a fixed support and the other part connected with the movable element to be actuated by fluid pressure. In accordance with the invention, the valve means B is, in a general way, movable bodily with the movable element.

In the particular application of the invention illustrated, the piston 21 of the mechanism A is connected with a fixed part so that it is the relatively stationary part of the mechanism, while the cylinder 20 is connected with the pull rod 13 of the brake actuating mechanism. The piston 21 is mounted for relative reciprocation with the cylinder 20 and is connected with the fixed part by means of a piston rod 22 projecting from the cylinder through one end, and a link or connecting rod 23 attached to the outer end of the piston rod. In the arrangement illustrated, the link 23 connects the piston rod 22 with the shaft 12 mounted in the vehicle frame 10. This particular manner of connecting the relatively stationary part or piston 21 of the mechanism A with a fixed part or support allows for a certain working or shifting of the piston 21 to properly adjust or align itself with the other parts during operation of the device.

The cylinder 20 of the mechanism A is connected with the rod 13 to communicate the action of the fluid pressure applied to the mechanism A to the rod 13. In the form and application of the invention illustrated the cylinder 20 is connected with the rod 13 through the valve means B which has connection with the rod 13.

The valve means B is provided to control the flow of fluid to and from the ends of the cylinder 20 and is under control of, or is operable through, the pedal 11. The means B includes, generally, a valve body 30 and a valve proper 31 operable in the body. The valve shown is of the piston type in which the body 30 is in the nature of a cylinder, while the valve 31 is in the nature of a piston operable in the cylinder.

In the form of construction illustrated, the valve cylinder or body 30 is rigidly connected with the cylinder 20 of the mechanism A, in fact, it is formed integral therewith. Further, the valve body 30 is directly and rigidly connected with the rod 13. In the drawings I have illustrated a screw threaded connection between the rod 13 and one end of the valve body 30. The valve 31 is slidably carried in the bore 32 of the body and has a stem part 33 projecting from the end of the body opposite to that to which the rod 13 is connected.

The stem 33 of the valve is connected with the pedal 11. The connection illustrated in the drawings includes a stem extension 35, an adjustable connection 36 between the stem 33 and the extension 35, and a pivot pin 37 connecting the extension 35 with the pedal 11. The adjustable connection 36 is made through a turn buckle suitably threaded to the adjoining ends of the stem 33 and extension 35. In practice lock nuts 38 may be provided on the threaded parts of the stem and extension to set the mechanism in adjusted position. This construction not only provides a means of adjusting the mechanism, the advantages of which will be apparent from the general disclosure, but also makes the device suitable for application to a brake operating mechanism as an attachment, it being obvious from the drawings how the usual pull rod of a manually operable brake mechanism can be cut and the valve means B, that is, the valve body 30 and the valve 31 and the stem 33 connected in the rod, thus applying the device of the present invention to the brake actuating mechanism at little expense and without material alteration or change in the original mechanism.

A fluid supply port 40 enters the middle portion of the cylinder and may be supplied with fluid under pressure through a suitable flexible conduit 41. A fluid outlet port 42 is provided at one end of the cylinder, preferably the end to which the rod 13 connects, it being preferred to connect the port 42 with a suitable flexible conduit 43 for conducting fluid from the device. It is to be understood that suitable fluid under pressure, preferably an inelastic fluid such as water or oil, may be supplied to the device through a conduit 41, or the like, at a suitable pressure and in a suitable quantity from any desired source, say for example, from a reservoir and a pump driven by power means in the vehicle such as the transmission, the vehicle engine or the usual storage battery present in the ordinary motor vehicle. The present invention is not concerned with the source or manner of supply of fluid under pressure or the details of supplying such fluid to and/or conducting it from the device of the present invention.

Cylinder ports 50 and 51 connect the bore of the valve body with the two ends of the cylinder 20 of the mechanism A. The ports 50 and 51 communicate with the interior of the valve body 30 at spaced points, preferably at points located in opposite directions from the fluid inlet port 40.

The valve 31 has a central opening extending into it from the end adjacent the outlet port 42 and has a recess or chamber 52 formed in its exterior to remain in communication with the fluid supply port 40. Chambers 50<sup>a</sup> and 51<sup>a</sup> are formed in the exterior of the valve at points spaced from the chamber 52 to cooperate with the ports 50 and 51, respectively. The chambers 52, 50<sup>a</sup> and 51<sup>a</sup> are in the nature of annular recesses formed around the valve 31 and are proportioned and located so that the valve has parts 50<sup>b</sup> and 51<sup>b</sup> located over or opposite the ports 50 and 51, respectively. The chambers 50<sup>a</sup> and 51<sup>a</sup> are in communication with the central opening in the valve 31, and are therefore in communication with the outlet port 42.

The valve parts above described are so proportioned and related that the valve 31 may be positioned in a central or neutral position where the parts 50<sup>b</sup> and 51<sup>b</sup> are related to the ports 50 and 51, respectively, so that fluid under pressure received through the port 40 enters the ports 50 and 51 equally, and as fast as it enters the ports it escapes to the chambers 50<sup>a</sup> and 51<sup>a</sup> discharging into the central opening of the valve and hence through the outlet port 42. Fig. 2 of the drawings illustrates the valve in the central or neutral position where the fluid is thus bypassed around the parts 50<sup>b</sup> and 51<sup>b</sup> of the valve, leaving the mechanism balanced with equal fluid pressure at the two sides of the piston 21. Movement of the valve 31 in either direction from the balanced or neutral position will immediately disturb the equilibrium or balanced condition at which the parts are at rest and will cause more pressure to come upon one side of the piston 21 than the other with the result that the mechanism is operated by the fluid pressure.

For example, upon movement of the pedal 11 in the direction indicated by the arrow in Fig. 3, the valve 31 is moved to the right in the body 30 allowing a greater amount of fluid from the chamber 52 to enter the port 51 than the port 50, or, if the movement is great enough, allowing all of the fluid to enter the port 51, while the port 50 is uncovered to the chamber 50<sup>a</sup> allowing free exhaust of fluid through the port 50 to the outlet port 42 of the valve. With this positioning of parts, fluid under pressure enters the cylinder 20 at the right hand end of the piston and is allowed to freely escape from the cylinder at the left hand end of the piston with the result that the cylinder 20 is moved by fluid pressure to the right with reference to the piston 21, or in the direction in which the pedal 11 is operated. When movement of the pedal 11 ceases, the fluid pressure acting on the mechanism in the manner just described will continue to move or operate the mechanism until it has moved the parts to the relative positioning shown in Fig. 2 where the parts are balanced and no further movement takes place. If the pedal 11 is moved in the opposite direction, for instance, if it is returned, say, under the action of a return spring 60, the direction of flow of fluid is reversed from that which occurs when the parts are positioned as shown in Fig. 3 with the result that the cylinder 20 is moved relative to the piston 21 in the direction indicated by the arrow in Fig. 4. This movement likewise will continue until the pedal stops, whereupon the fluid pressure will actuate the parts until they are in the relative positioning shown in Fig. 2 where all forces are balanced and the mechanism remains at rest, the rod 13 being held at rest by the fluid pressure.

In practice it has been found that the mechanism instantly responds to the slightest movement of the pedal or actuating member 11 causing the rod 13 to be moved under the influence of the fluid pressure, it being obvious that the mechanism will stop in any position, depending upon the positioning of the pedal 11, and that the rod 13 will be held stationary by the fluid pressure applied to the device. Very little pressure is required to operate the valve while the force with which the rod is operated depends upon the pressure of the operating fluid and the proportioning of the parts.

In order to permit easy operation of the actuating rod 13 by the control rod 33, in case that the fluid pressure supply should fail, I preferably provide a bypass between the intake conduit 40 and the exhaust conduit 42, said bypass may be in any form and is preferably so arranged that the fluid may pass only from the exhaust conduit 42 towards the intake conduit 40. In Fig. 5 I have shown one way of carrying out this bypass wherein conduits 55 and 56 terminate in a valve chamber adapted to be closed by a suitable valve member 57. This valve may be held in place by a suitable spring or, if desired, the valve may be in the form of a ball check valve, the point being that the valve prevents the flow of fluid from the inlet conduit 40 during normal operation of the device but permits flow of fluid from the conduit 42 towards the conduit 40 in case that pressure in the intake line should fail.

For the purposes of illustration, I have shown considerable play between the valve unit 31 and the valve housing, but it will be understood that this valve unit 31 is so designed and constructed that very slight movement of the rod 33 will be sufficient to move the rod 13 in the event of failure of the fluid pressure means. In fact the play between the valve and the valve casing is so delicate that movement of only a few thousandths of an inch is all that is necessary. It will, therefore, be obvious that the mechanical connection between the pedal 11 and the rod 13 is substantially rigid, in fact the connection is substantially as close as connections usually employed in mechanism of this character, so that if the fluid pressure fails, the play between the control rod and the actuating rod will be unnoticeable to the operator.

In Figs. 6 and 7 I have illustrated a practical embodiment of my invention in connection with steering gear structure, the only modification from the structure shown in Figs. 1 to 5 being the particular manner of connecting the structure to the steering gear control and operating levers. In this modification the conventional steering column is indicated as at 60, the steering arm at 61 and the drag link at 62.

The fluid pressure actuating means may be essentially the same as illustrated in Figs. 1 to 5 with the exception that in the embodiment shown in Figs. 6 and 7 the position of the cylinder and piston mechanism A and the valve housing B is reversed. The steering arm 61 is connected to the valve by means of an arm 63 which corresponds to the arm 33 in Fig. 5. The integral housing which forms the piston and valve housing is connected to the actuating lever 62 which corresponds to the actuating lever 13 in Fig. 5. The piston rod is pivotally connected to the frame at a point 64. Otherwise the structure shown in Fig. 7 is identical with the actuating mechanism shown in Figs. 1 to 5 and for the purposes of convenience is given the same general reference numbers. It will be obvious that regardless of the relative positions of the piston and cylinder structure and valve structure of the fluid pressure control unit that such unit as a whole will be freely supported by the movable or actuating element and the control member.

Having described my invention, I claim:

1. A device for use in connection with a movable element and a control member including, a fluid pressure actuated means operable to move the movable element, a valve for said means for actuation by the control member and a valve housing for said valve connected to and movable with the movable element, said means and valve housing being freely supported by said control member and movable element.

2. A device for use in connection with a movable element and a control member including a fluid pressure actuated piston and cylinder structure operable to move the movable element and a valve mechanism for controlling the operation of said piston and cylinder, said valve housing and cylinder being formed integrally and freely supported by said movable element, control member and piston.

3. A device of the class described for use in connection with a movable element and a control member including, a fluid pressure actuated means operable to move the movable element in either direction, a valve for said means for actuation by and mounted in alignment with the control member, and a valve housing for said valve connected to and movable with the movable element, said means and valve housing being freely carried by and movable with said movable element and control member.

4. A device of the class described for use in connection with a movable element and a control member including, a fluid pressure actuated means for operating the movable member including two parts, one a piston and the other a cylinder, said piston being pivotally connected with a stationary support and said cylinder being operatively connected with and carried by the movable element, piston and control member, and a control valve for said means operable by the control member and movable and mounted in alignment with the movable element.

5. A power control for power propelled vehicles, comprising an arm adapted to be actuated by the operator, an inelastic fluid circulating system, under pressure, operating means in said system comprising piston and cylinder structure, a valve having a valve housing formed integrally with said cylinder and adapted to control the flow of fluid to said operating means, a movable element connected to said valve housing means for connecting said arm with said valve for shifting the same, the degree of movement of the valve regulating the degree of movement of said cylinder, said piston being relatively stationary but pivotally mounted, and said valve housing and cylinder being freely supported by said piston, valve and movable element.

6. A fluid pressure actuated unit adapted to be connected into a manually controlled actuating system of power propelled vehicles including a movable element and a manual control member, and embodying piston and cylinder operating members, one of which is stationary and pivotally mounted, a valve, and valve housing structure rigidly connected to said movable operating member and freely supported by said movable element and control member, said manual control member being connected through an end wall of the housing to said valve and the movable element to the opposite end wall of said valve housing, and flexible inlet and outlet conduits connected to a side wall of said valve housing intermediate said end walls.

7. A fluid pressure actuated unit adapted to be connected into a manually controlled actuating system of power propelled vehicles including a movable element and a manual control member, and including piston and cylinder structure, a piston rod pivotally mounted to a stationary part of the vehicle, a valve for controlling the application of power to said cylinder, valve housing structure integral with said cylinder and freely supported by said piston, movable element and manual control member, said manual control member being connected to said valve and the movable element to said cylinder and valve housing, and flexible conduits connected to said valve housing.

8. A device of the character described, comprising a movable element and a control member, a power transmitting unit connected to said element and freely supported by said movable element and control member and including piston and cylinder structure and follow-up valve structure, the housing for said valve structure being rigidly connected to said cylinder, flexible conduits connecting said valve structure with a continuous source of fluid supply, passageways in said valve and cylinder structure for conducting fluid to and from both sides of the piston, and a valve structure in said housing and connected to said control member for controlling the supply of said fluid to said passageways and from said passageways back to the source of supply, said valve structure being hollow and adapted in normal position to by-pass said incoming fluid through the valve to the exhaust conduit and maintaining a constant pressure on both sides of the piston.

9. A device of the character described comprising a movable element and a control member, a fluid pressure power transmission unit connected to said element and including piston and cylinder structure and a valve and valve housing all freely supported by said movable member, piston and control member, a continuous operating inelastic fluid circulating system, under pressure, said control member being connected with said valve for controlling the relative movement between said piston and cylinder in either direction, said movable element moving with the control element and means for by-passing the fluid exhausted from the cylinder to the inlet side of the cylinder in the event that the circulating system should fail.

10. A device of the character described, comprising a fluid pressure actuated means and a valve and valve housing movable as an integral unit, said means consisting of a cylinder and a pivotally mounted piston, a follow-up control valve within said valve housing, a manually operable control member secured to said follow-up valve, and a movable element secured to one end of the valve housing in alignment with said follow-up valve, said follow-up valve having a limited movement within the valve housing whereby if the fluid pressure fails the cylinder and valve housing will be operated manually by the control member, said cylinder and housing being freely supported by said movable element, follow-up valve structure and pivotally mounted piston.

11. A device for use in connection with a pivotally mounted movable element and a control member including, a fluid pressure actuated piston and cylinder structure operable to move the movable element, a valve connected to said control member for controlling the operation of said piston and cylinder, a valve housing for said valve connected to and movable with the cylinder and movable element, said valve housing and cylinder being freely supported by a combination of said piston, control member, and movable element.

HARRY F. VICKERS.